(12) United States Patent
Arvidsson et al.

(10) Patent No.: US 6,263,004 B1
(45) Date of Patent: Jul. 17, 2001

(54) LASER

(75) Inventors: Magnus Arvidsson, Sollentuna; Bjorn Hansson, Vallentuna; Carsten Lindstrom; Martin Holmgren, both of Stockholm, all of (SE)

(73) Assignee: Spectra Precision AB, Danderyd (SE)

( * ) Notice: Subject to any disclaimer, the term of this patent is extended or adjusted under 35 U.S.C. 154(b) by 0 days.

(21) Appl. No.: 09/230,862

(22) PCT Filed: Jun. 5, 1998

(86) PCT No.: PCT/SE98/01071

§ 371 Date: Feb. 2, 1999

§ 102(e) Date: Feb. 2, 1999

(87) PCT Pub. No.: WO98/56088

PCT Pub. Date: Dec. 10, 1998

(30) Foreign Application Priority Data

Jun. 6, 1997 (SE) .................................................. 9702175

(51) Int. Cl.$^7$ .................................................. M01S 3/113
(52) U.S. Cl. .................................. 372/11; 372/26; 372/27
(58) Field of Search ................................ 372/11, 25, 26, 372/27

(56) References Cited

U.S. PATENT DOCUMENTS

| | | | |
|---|---|---|---|
| 3,896,397 | 7/1975 | DeWit et al. ........................ | 372/100 |
| 4,019,156 | 4/1977 | Fountain et al. ............. | 331/94.5 ML |
| 5,151,915 | 9/1992 | Paoli ..................................... | 372/50 |
| 5,267,255 | 11/1993 | Paoli ..................................... | 372/50 |
| 5,345,454 | 9/1994 | Keller .................................... | 372/12 |
| 5,394,413 | 2/1995 | Zayhowski ............................ | 372/10 |
| 5,488,619 | 1/1996 | Injeyan et al. ........................ | 372/12 |
| 5,675,596 | 10/1997 | Kong et al. ............................ | 372/25 |
| 5,832,013 | * 11/1998 | Yessik et al. .......................... | 372/26 |

FOREIGN PATENT DOCUMENTS

| | | |
|---|---|---|
| WO 95/06345 | 3/1995 | (WO) . |
| WO 97/31411 | 8/1997 | (WO) . |

OTHER PUBLICATIONS

A. Yariv, "Optical Electronics in Modern Communications", pp. 227–235, Oxford University Press, Inc., vol. 1997. (No month).

J. Wilson et al., "Optoelectronics an Introduction", pp. 226–230, Prentice Hall International Ltd., vol. 1989. (No month).

* cited by examiner

*Primary Examiner*—James W. Davie
(74) *Attorney, Agent, or Firm*—Young & Thompson

(57) ABSTRACT

A Q-switched laser, which is pumped by at least one pump source (8), providing pulses. The laser comprises two mirrors (3,5) providing a laser cavity, in which a gain medium (2), a saturable absorber (4) and a controllable active modulator (6) is situated. Loss can be introduced in the modulator (6) by a control device (10). In a first phase, said control device (10) introduces loss in the active modulator, setting a threshold inversion density band to a level (B) high enough to be above the actual inversion density in the gain medium means. In a second phase, the control device lowers said loss instantly, which will lower the threshold inversion density band to a level (A) lower than the actual inversion density in order to activate emission of said Q-switched pulse.

25 Claims, 8 Drawing Sheets

LASER

This application is the 35USC 371 national stage application of PCT/SE98/01071 filed Jun. 5, 1998, which designated the United States of America.

This invention relates to a Q-switched laser having exactly determinable laser pulses. Thereby, it is possible to provide stabilisation of the repetition rate of a pulsed laser. The invention relates essentially to a Q-switched micro-chip laser.

This kind of laser generates extremely short, high-peak-power laser pulses which could be useful in many applications, for instance in electronic distance measuring devices (EDM). For these applications it is important to generate each short Q-switched laser pulse at an exactly determinable tine. It is also important to be able to generate a pulse train having exactly determinable time intervals between the individual pulses, i.e. the jitter in time between the pulses should be kept at the lowest possible level.

BACKGROUND OF THE INVENTION

Diode pumped solid-state laser is a rapidly growing field. Passively Q-switched micro-chip lasers are particularly interesting as they are able to provide short pulses (<1 ns) with high peak power (kW) for moderate pump powers, from, for instance, a laser diode or the like, using a simple configuration.

A problem with passively Q-switched lasers is the large jitter in repetition rare. The jitter makes this type of laser impossible to use in a number of applications. In these applications the only possibility has been to use actively Q-switched lasers.

Different techniques for reducing the jitter in passively Q-switched lasers have been described and shown, for instance in "A stabilised mnicrochip laser" by M. Arvidsson et al, CLEO Europe 1996. Hamburg, Paper CFH2 and in "Characterization of Passively Q-switched Microchip Lasers for Laser Radar" by W. J. Manderville and K. M. Dinndorf, SPIE, vol. 2748, pp 358.

A passively Q-switched micro-chip laser for producing high-peak-power pulses of light of extremely short duration is also described in U.S. Pat. No. 5,394,413. A saturable absorber prevents the onset of lasing until the average inversion density within the cavity of the Q-switched laser reaches a predetermined value. The configuration of the laser is then such that, at onset of lasing the saturable absorber becomes transparent, i.e. it is said to be bleached, and a Q-switched output pulse having an extremely short length and high peak power is generated. The problem with this kind of Q-switched lasers is that the lasing times are dependent on its dimensions and not controllable in an exact way.

Actively Q-switched lasers, for instance described by Yariv A., "Optical Electronics in Modern Communications" Fifth Edition, pp 227 to 235, or by Wilson J. Et al, "Optoelectronics An Introduction", Second Edition, pp 226 to 230, demands a very high round trip loss from the active modulator. This loss is in the order of 100%, which requires a high voltage switching device.

However, actively Q-switched lasers, i.e. Q-switched lasers in which the control of the Q-switching is done directly at the Q-switch, for instance by changing the polarisation of the light, have other problems, such as high switching voltages, possibility of multiple pulsing due to piezoelectric effects and large laser cavities due to large size required regarding the active modulator. Actively Q-switched lasers also need fast high voltage switching power supplies to work.

There is a need for a Q-switched laser in a lot of applications having controllable pulsing, small size and not requiring the high voltage switching devices as nornally being required in actively Q-switched lasers.

A Q-switched mode-locked laser is disclosed in U.S. Pat. No, 4,019,156. This "dual modulation" laser is capable of producing transform-limited pulses having a controllable pulse duration and operates as a synchronous driven optical resonator. Intracavity spontaneous emission is gated symmetrically in time by a Pockels cell that is utilised to provide the first Q-switching and then 100% loss modulation in synchronisation with the pulse round trip time in the cavity. The function of the Pockels cell is thus to suppress the spontaneous emission generated by the active medium in order to let the laser be synchronised, to change the pulse length, and thereby synchonize the pulse length, and to provide order mode-locking. It does thus not participate in the very switching function. The function of the Pockels cell is here to provide a stabilisation. The time for each laser pulse could not be chosen at will but is determined by the design of the laser, i.e. the length of the cavity.

SUMMARY OF THE INVENTION

An object of the invention is to provide a Q-switched laser having an exact determinable time for its lasing pulse.

Another object of the invention is to provide a Q-switched laser having an exactly determinable repetition rate with low jitter.

Still another object of the invention is to provide a small sized Q-switched laser having an extremely exact repetition rate and/or extremely exactly determinable times for each emitted laser pulse.

Yet another object of the invention is to provide a Q-switched laser having an exactly controllable time for its lasing pulse but not requiring a high voltage switching device.

The invention relates to a Q-switched laser and device combining the features, and thus the advantages, of both actively and passively Q-switched lasers, preferably microchip-lasers, which is pumped by at least one pump source.

According to the invention a laser is provided with both a saturable absorber and an active modulator. The combined losses of the active modulator and the saturable absorber delays the onset of lasing, thereby creating a large inversion density. By combining the losses from the saturable absorber and the active modulator, the loss from the active modulator can be drastically reduced compared to the loss from an active modulator in an actively Q-switched laser.

At the instant when a laser pulse should be emitted the loss introduced by the active modulator is removed. Then the gain in the laser exceeds the losses and the lasing starts to bleach the saturable absorber giving rise to a laser pulse. Thereby it is possible to define when the laser pulse is to be emitted in a very accurate way.

The spontaneous emission from the laser media can be monitored in order to know the inversion density. This is possible since the spontaneous emission is proportional to the inversion density. The inversion density or the losses in the cavity could then be controlled to ensure that the laser pulse occurs at the right time.

Those two ways of jitter minimizing can be used either alone or both of them combined.

Thus, the invention relates to a Q-switched laser A Q-switched laser, which is pumped by at least one pump source, providing pulses, and comprising a first mirror means at the first end and a second mirror means at the second end, at least one of said mirrors being partically transmittable and the space between said mirrors providing a laser cavity.

According to the invention this Q-switched laser is characterized by a combination of gain medium means, saturable absorber means and controllable active modulator means between the first and second mirror;

whereby the losses from said controllable active modulator means being less than the loss required for suppressing lasing in the said laser cavity; the losses from said saturable absorber means being less than the loss required for suppressing lasing in the said laser cavity; and the combined losses from said saturable absorber means and said active modulator means being greater than the losses required for suppressing lasing in the said laser cavity during the determined time between pulses;

control means controlling the lasing such that:

in a first stage the combined losses from said saturable absorber means and said active modulator means is present in said laser cavity, setting the threshold inversion density band high enough to suppress lasing; and in a second stage the loss from said active modulator is instantly removed, lowering the threshold inversion density band to a level lower than the inversion density in the said cavity, resulting in bleaching of said saturable absorber and thereby the build up of a giant pulse at the determined time.

Solid state material, like rare earth doped materials (e.g. Nd:YVO$_4$), chromium doped material semiconductor materials, gases, dyes or the like can be used as gain-medium Cr$^{4+}$ material (e.g. Cr$^{4+}$:YAG) or other solid state material, semiconductor materials or the like can be used as saturable absorber.

LINbO$_3$, KTP or other related material semiconductor materials or the like can be used as active modulator.

The active modulator is preferably situated between the mirrors; and, in a first phase, the control means introduces loss of the active modulator, setting a threshold inversion density band to a level high enough to be above the actual inversion density in the gain medium means, and, in a second phase, lower the loss instantly, lowering the threshold inversion density band to a level lower than the actual inversion density in order to activate emission of the Q-switched pulse. The saturable absorber and the modulator could be a combined element controllable by the control means, or the gain-medium and the modulator can be a combined element controllable by the control means, or the gain medium and the saturable absorber can be a combined element, or the gain medium and the saturable absorber and the modulator can be a combined element controlled by the control means.

From the theory describing the Q-switching of the passively q-switched laser the threshold inversion density in the laser medium can be calculated from Eq. 1 (See Zayhowski & Dill in Opt. Lett. 19(18) 1994.

$$N_0 = (\gamma_{sat,rt} + \gamma_{par,rt} + \gamma_{op})/\sigma l_{rt} \tag{1}$$

Here $N_0$ is the threshold inversion density in the lasing media $\gamma_{sat,rt}$ is the round trip unsaturable loss constant, $\gamma_{par,rt}$ is the round trip unsaturable intracavity loss constant, $\gamma_{op}$ is the loss constant due to output coupling, $\sigma$ is the emission cross section of the laser transition and $l_{rt}$ is the round trip path length of light in the cavity. Since the build up of the lasing is a statistical process, the threshold value, $N_0$ is not an exact value but rather a small window or a band wherein the lasing starts and the pulse is emitted.

As mentioned above the laser according to the invention comprises a combination of both a saturable absorber and an active modulator. The active modulator acts as an extra loss in the cavity. If we add the round trip loss from the active modulator, denoted $\gamma_{am,rt}$, Eq. 1 will be modified into Eq.2.

$$N_{0am} = (\gamma_{sat,rt} + \gamma_{par,rt} + \gamma_{op} + \gamma_{am,rt})/\sigma l_{rt} \tag{2}$$

The loss from the active modulator have been added to the other losses and will give rise to a higher threshold inversion density band. The inversion density can now be raised to a level above $N_0$ without lasing. When the laser pulse is to be emitted the loss from the active modulator $\gamma_{am,rt}$ is removed and the inversion density is well above the threshold inversion density band, $N_0$. Thus, lasing will start to build up and a pulse will be emitted a short time after the removal of $\gamma_{am,rt}$.

The lasing in the cavity is built up from the optical noise present. The optical noise is dependent on the inversion density N. The uncertainty in time for the pulse emission is dependent on the level of optical noise in the cavity and on pulse build up time. As long as N is above $N_0$ the uncertainty will be smaller for a greater value of N because of the higher noise level.

The behaviour of the pulse build up can be compared with the pulse build up in an actively Q-switched laser given by eq.3. Siegman, Lasers University Science Books, Sausalito Cailf., p. 1012, 1986.

$$T_b \approx T \ln(n_{ss}/n_i)/[(N_i/N_0 - 1)\gamma_c] \tag{3}$$

Here T is the round trip time for light in the cavity, $n_{ss}$ is the steady state photon number in the cavity that would be present if the loss from active modulator is removed with the same pumping. $n_i$ is the photon number in the cavity immediately after switching. $N_i$ is the inversion density directly after switching. $N_0$ is the threshold inversion density. $\gamma_c$ is the losses in the cavity including output coupling. A typical value of $n_i$ is a few photons.

Since the pulse build up is a statistical process this is not an exact value. The uncertainty in time for the output of a pulse is related to the pulse build up time. A longer pulse build up time will result in a larger uncertainty.

In a passively Q-switched laser the ratio $N_i/N_0$ is only slightly above unity, resulting in a long pulse build up time corresponding to a large uncertaily in time for emission of a pulse.

In the cavity with both the sanirable absorber and the active modulator the ratio $N_i/N_{0i}$ is larger than for passive Q-switching and therefore a shorter pulse build up time and a smaller uncertainty is achieved.

Another way to achieve a small uncertainty in time of the start of pulse build up is to inject laser radiation into the cavity to ensure that pulse build up starts immediately. Still another way is to insert a partially transmittable mirror within the cavity and thereby staring the lasing in part of the cavity prior to lasing in the section containing a saturable absorber.

The essence of this show that it is possible with the invention to control the time for emission of a pulse very accurately. This is possible with a, compared to active Q-switching, low actively modulated loss in the cavity in combination with an absorber.

A typical loss from the active modulator in this invention is 10% whereas in active Q-switching the loss is typically 100%. The jitter can be reduced drastically compared to a passively Q-switched laser.

A wavelength converting means could be provided converting the wavelength of the laser pulse to another wavelength. The wavelength converting means could be provided on the outside of one of the mirrors or somewhere between the mirrors and comprises non-linear material providing a non-linear conversion. It is also possible to utilise wavelength converting effects, for example non-linear effects in anyone or several of the elements in the laser cavity.

Materials from the KTP family, BBO, $LiNbO_3$ or any other non-linear material could be used as wavelength converting material. These materials can be used with or without quasi phase matching.

The modulator could comprise a material having controllable transmission controlled by the control means to change transmission between lower and higher transmission. The modulator could also comprise an acousto-optically or electro-optically controllable material deflecting at least a part of the beam inside the laser when actively controlled by the control means. Means could be provided for monitoring spontaneous emission from the laser medium means, the emission is proportional to the inversion density in the gain medium Control means can control the inversion density in the gain medium with pump power coupled into the laser cavity.

Means could be provided for monitoring spontaneous emission from the laser medium means, the emission is proportional to the inversion density in the gain medium. Control means controlling the inversion density in the gain medium with pump power coupled into the laser cavity and controlling the threshold inversion density with the loss in the laser cavity.

The control means can reset the pump pulse when the Q-switched laser pulse has been emitted. The modulation of the pump laser source can be controlled so as to have a varying frequency during an operation period. All elements could be bounded together either by diffusion bonder or optically bonded. The pump diode could be directly pumping the laser crystal or coupled through lenses as a fiber.

The complete assembly could be integrated on a single chip or substrate to facilitate temperature control and heat removal.

The optical parts couls be selfaligned onto a substrate in order to reduce the construction size and prepare for massproduction.

ADVANTAGES WITH THE INVENTION

The most important advantage with the laser according to the invention is that it is possible to build a small and compact laser using low control voltage and low power consumption which could be stabilised concerning jitter and performance.

BRIEF DESCRIPTION OF THE DRAWINGS

For a more complete understanding of the present invention and for further objects and advantages thereof, reference is now made to the following description taken in conjunction with the accompanying drawings, in which:

Referring to FIG. 1, a Q-switched laser 1. such as a solid-state microchip Q-switched laser having a cavity comprising an active gain medium 2 of for instance $Nd:YVO_4$ crystal, or another rare earth doped material chromium doped material, semiconductor materials, gases dyes or the like, having a mirror 3 at one end and as a Q-switch material, a saturable absorber 4 of for instance $Cr^{4+}$:YAG or $Cr^{4+}$:YSGG, other $Cr^{4+}$ material, other solid state materials, semiconductor materials or the like, the materials mentioned above might be epitaxially grown on each other. A second mirror 5 is placed at the output end of the Q-switched laser near the saturable absorber 4. In the embodiment shown the mirror 5 is acting as out-coupling mirror. The Q-switched laser 1 could be a micro-chip laser.

Figure 1:
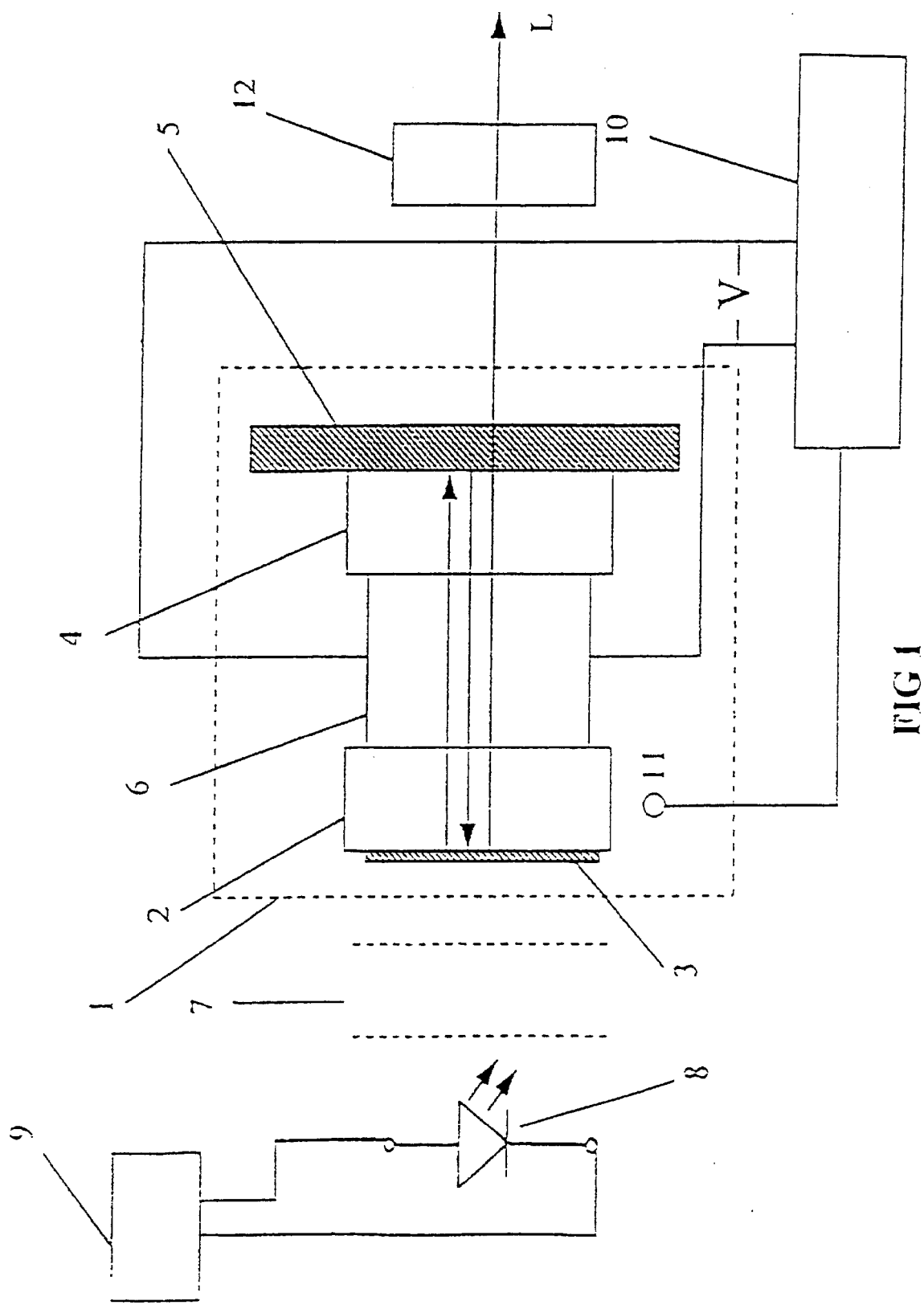
FIG. 1 shows schematically a first embodiment of the Q-switched laser to be used according to the invention.

The Q-switched laser is in this embodiment pumped by at least one laser diode 8, which has a wavelength matched to the absorption band of the active material, through a lens system 7 or other optical means leading the light from the pump laser diode 8 to the gain medium 2 through the mirror 3. The pump-light could also go directly through the mirror 3 and into the gain medium 2. In the case of the lasing crystal being $Nd^{3+}:YVO_4$ the pump wavelength is about 808 nm. It is also possible to use more than one laser diode. The laser diode 8 has power supplied by a control device 9.

In this embodiment an active modulator 6 is positioned between the gain medium 2 and the saturable absorber 4 of for instance $LINbO_3$, KTP, other non-linear materials, semiconductor materials or the like. However, it is to be noted that the modulator 6 and the saturable absorber 4 could change place with each other (not shown). The modulator 6 is in this embodiment controlled by a control device 10 between essentially two states, the first one when it is essentially filly transparent for the beam inside the laser, in which case the laser can act as a passive Q-switched laser virtually comprising only the gain media 3 and the saturable absorber 4 between the mirrors 3 and 5, and the second one when a loss is inserted in it making the laser acting more as an actively Q-switched laser provided with an active modulator. A loss could be introduced in the active modulator 6 by the loss introduction control circuit 10.

The elements in the laser can be bonded together optically or diffusion bonded. They can also be put together with index matching fluid or the like. They can also be placed separately but then preferably treated with anti-reflex layers.

Figure 2:
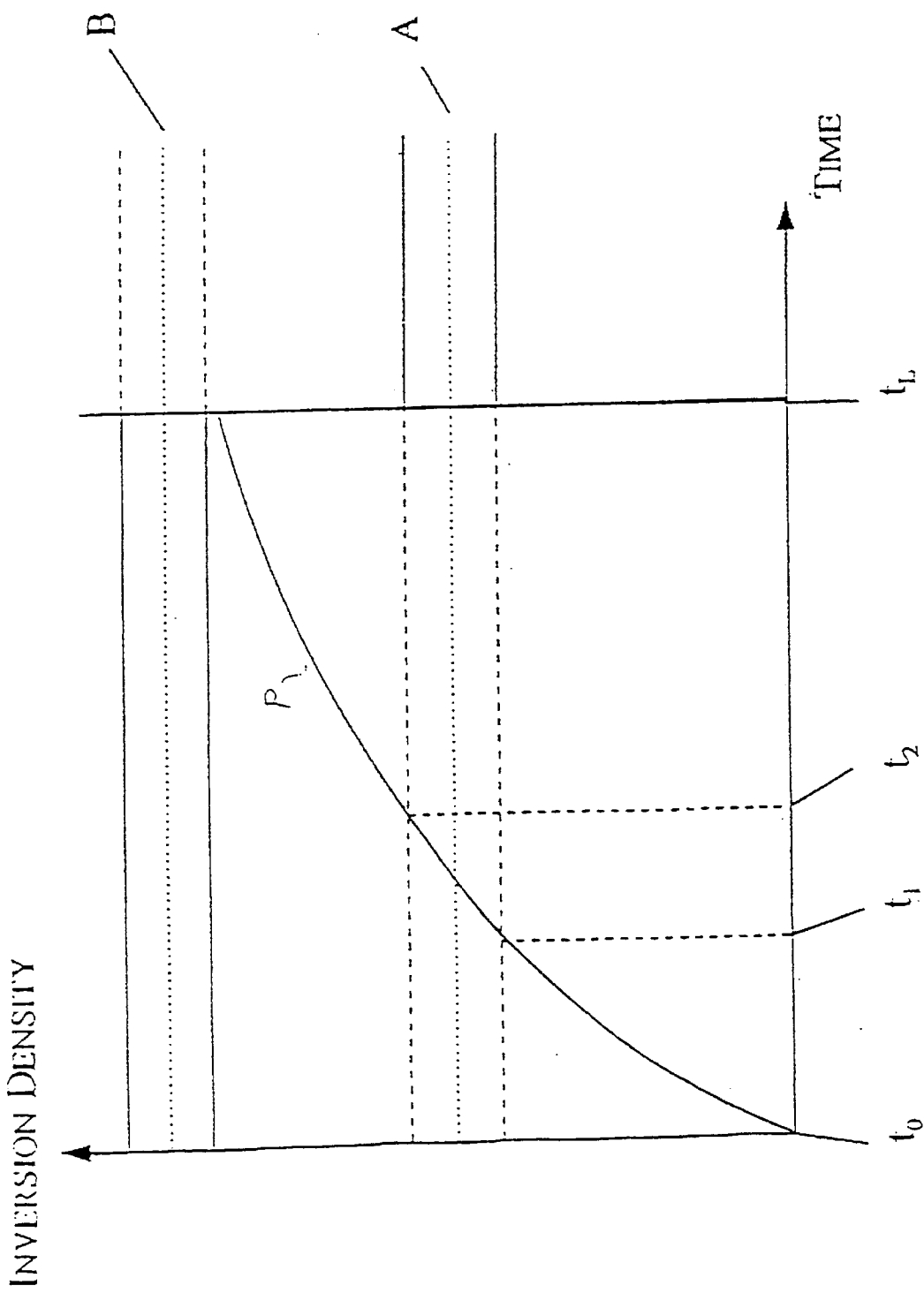
FIG. 2 shows a diagram illustrating the function of the invention.

In the diagram shown in FIG. 2 the threshold inversion band regarding the inversion within which a laser pulse is likely to be emitted at rising inversion when the laser is acting as a passive Q-switched laser is illustrated at A. B illustrates the threshold inversion band within which the laser pulse is likely to be emitted when the extra loss from the active modulator is inserted into the cavity. Thus, the losses in the laser comprises one part induced by the saturable absorber and one part induced by the active modulator.

The curve P is the rising inversion density in the gain medium starting at $t_0$ when the pump laser diode 8 is tamed on and/or the cavity is emptied after the last laser pulse. At that time, the loss is already introduced in the modulator 6 by the control circuit 10 and the threshold inversion band B is the valid one, as illustrated by continuous lines for the band limits. If the band A should have been the valid one a laser pulse would have been emitted somewhere between the times $t_1$ and $t_2$.

The inversion density curve rises beyond the inversion density band A, which at that time is not the valid band, as illustrated by the dashed lines for the band lines. This could be monitored, for instance by using a light sensor 11 measuring the spontaneous emission of light emitted from the laser. Alternatively, the time from $t_0$ could be measured to establish a time longer than $t_2$ when according to experience it is certain that the curve P has risen beyond the band A. It is also important to make sure that the curve P does not rise up to the band B.

Then, the loss introduced in the modulator 6 is turned off at the time $t_L$. The threshold inversion band B will then not be valid, as illustrated with dashed lines, and the threshold inversion band A will be the adequate one for activating a laser pulse L, as illustrated with continuous lines. Since this band A now is well below the actual inversion density level on the curve P the laser pulse will be emitted instantly at $t_L$. Experiences have reviled that the precision of the lasing time has increased by a factor 1000, i.e. the exact time point has been set inside a time span of 100 ps instead of the normal time span of 100 ns provided with other "exact" methods.

The introduction of loss in the modulator 6 could be made by several methods, such as electro-optical acousto-optical, pressure methods, variable reflectance on at least one of the mirrors 3, 5, use of controllable solid state modulator 6 or the like.

An illustrative embodiment could be to have the gain-medium 2 as a medium providing a strongly polarised emission, i.e. the light in the laser pulse is polarised. The gain-mediunm 2 could thus be a crystal emitting polarised light or it could comprise a crystal emitting un-polarised light together with a separate polarizer.

The active modulator 6 is of electrooptical kind which is fully transparent when some voltage $V_T$ is connected across it by the control device 10 and introducing a polarisation of elliptical lind to the polarised beam when a voltage $V_M$ is connected across it by the control device 10, and introducing a loss into the system in this way. The elements 2 to 5 are firmly pressed together in this embodiment, e.g. diffusion bonded, so that the laser beam L can pass directly from element to element.

Thus, the light from the gain medium 2 will be linearly polarised. When the light passes through the active modulator 6 it will be elliptically polarised, and the light will be further elliptically polarised after it has been reflected by the mirror 5 and gone through the modulator 6 again. Thereby, the returing light is less intense in the preferred lasing polarisation than the original light since a polarisation shift is induced by the modulator. The polarisation shift will give rise to a loss in the cavity. A laser pulse will not be emitted as long as the inversion density lies below the higher threshold inversion band B.

As soon as a laser pulse is to be emitted the voltage $V_M$ is brought to $V_T$ at the time $t_L$, the polarising effect by the modulator 6 is turned off, and a laser pulse L will be emitted.

Another kind of modulator 6 is an acousto-optical device deflecting a part of the beam when activated. Then, the gain-medium crystal 2 need not be polarised. If another wavelength than the one provided by the laser cavity is desired, then a wavelength converting device 12 could be placed such that the laser light L will pass through it The device 12 could comprise non-linear matenral such as KTP, BBO, $KNbO_3$, $LiNbO_3$ or the like, providing a non-linear conversion.

The modulator could be an active controllable solid state modulator.

Figure 3:
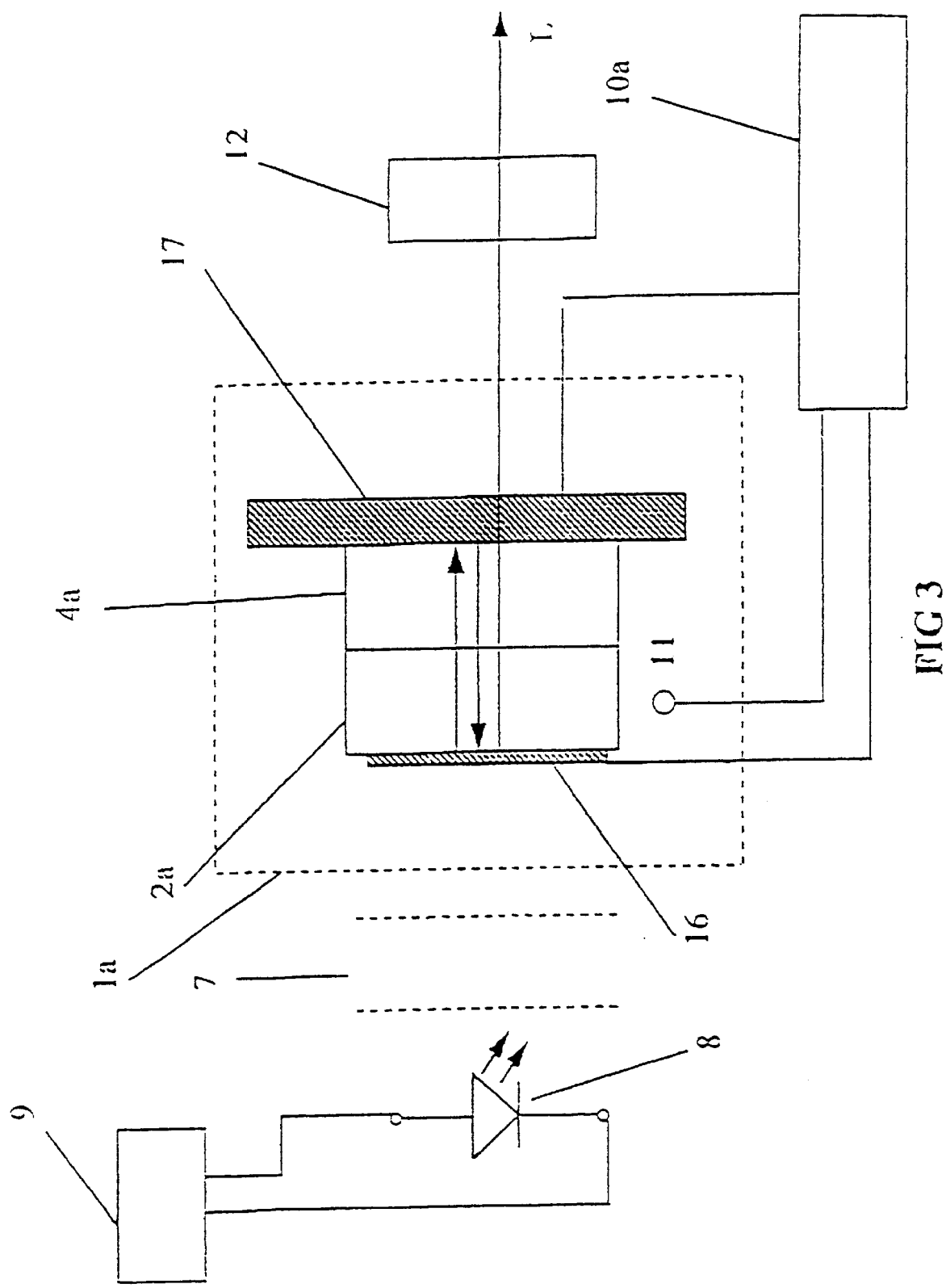
FIG. 3 shows schematically a second embodiment of the Q-switched laser according to the invention.

In the embodiment shown in FIG. 3 the laser 1a comprises a gain-medium 2a and a saturable absorber 4a placed between mirrors 16 and 17. One of the or both mirrors 16 and 17 have a reflectance which is controllable by a loss introduction circuit 10a which controls the reflectance of the mirror 16 and/or the mirror 17 to be relatively low at the start of the activation of the pump diode 8a and which controls the reflectance to be high when the laser beam is to be released. The controllable mirrors could be dielectrical. Thus, in his embodiment, the modulation is done by changing the charactersstics of at least one of the mirrors.

Figure 4:
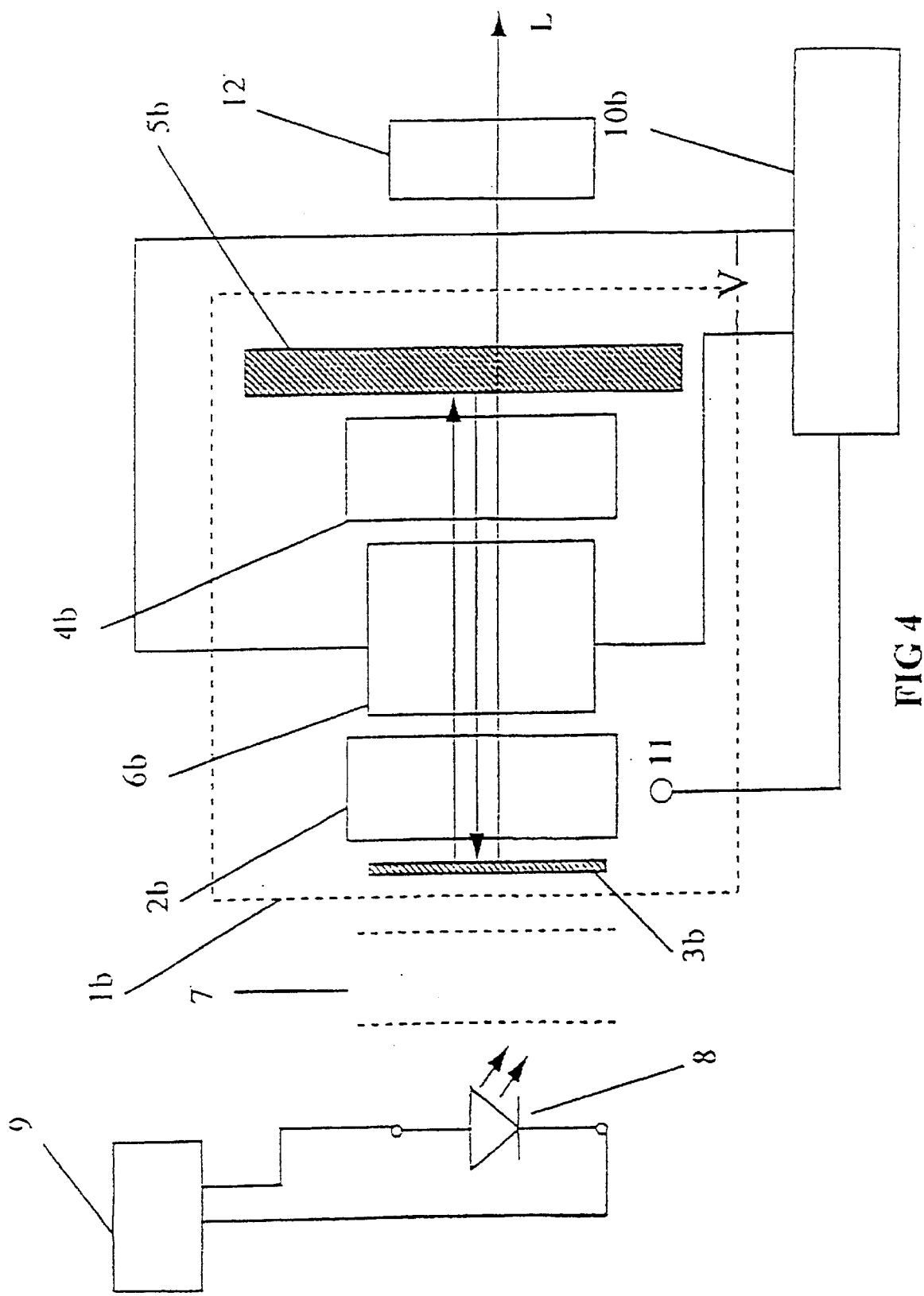
FIG. 4 shows schematically a third embodiment of the Q-switched laser according to the invention.

In the embodiment shown in FIG. 4, the laser 1b comprises a aain-medium 2b and a saturable absorber 4b placed between mirrors 3b and 5b. A controllable active modulator 6b of for instance electro-optical or acousto-optical idnd is placed between the elements 2b and 4b. The elements 2b to 5b are not in mechanical contact with each other. The surfaces of the elements through which the laser light passes might be anti-reflex-coated or an index matching fluid is provided between adjacent surfaces.

Figure 5:
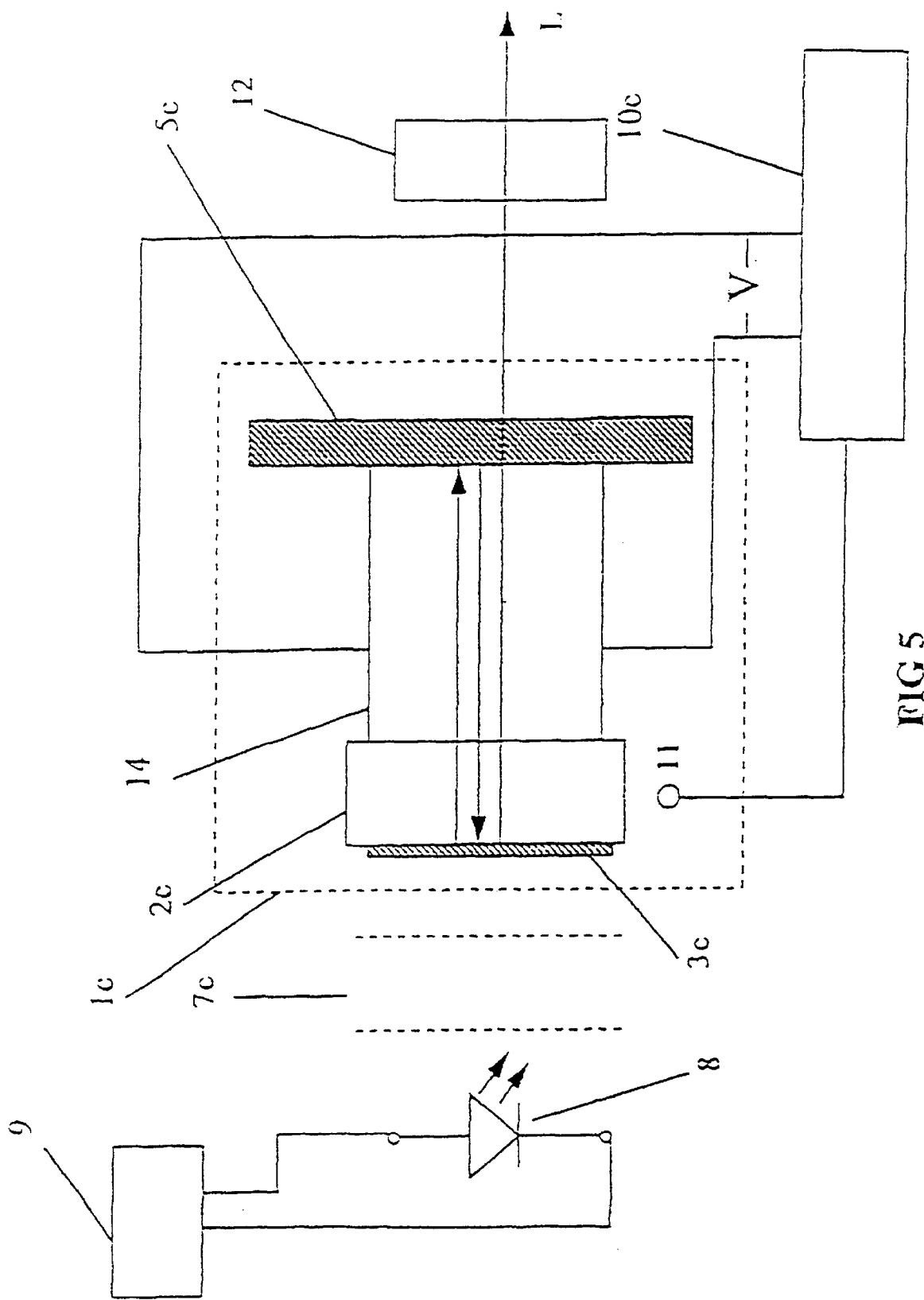
FIG. 5 shows schematically a fourth embodiment of the Q-switched laser according to the invention.

In the embodiment shown in FIG. 5, the laser 1c comprises a gain-medium 2c and a combined element 14 having both the saturable absorber and the active modulator function between a first mirror 3c and a second mirror 5c. The modulation of the combined element 14 is controlled by the control circuit 10c.

Figure 6:
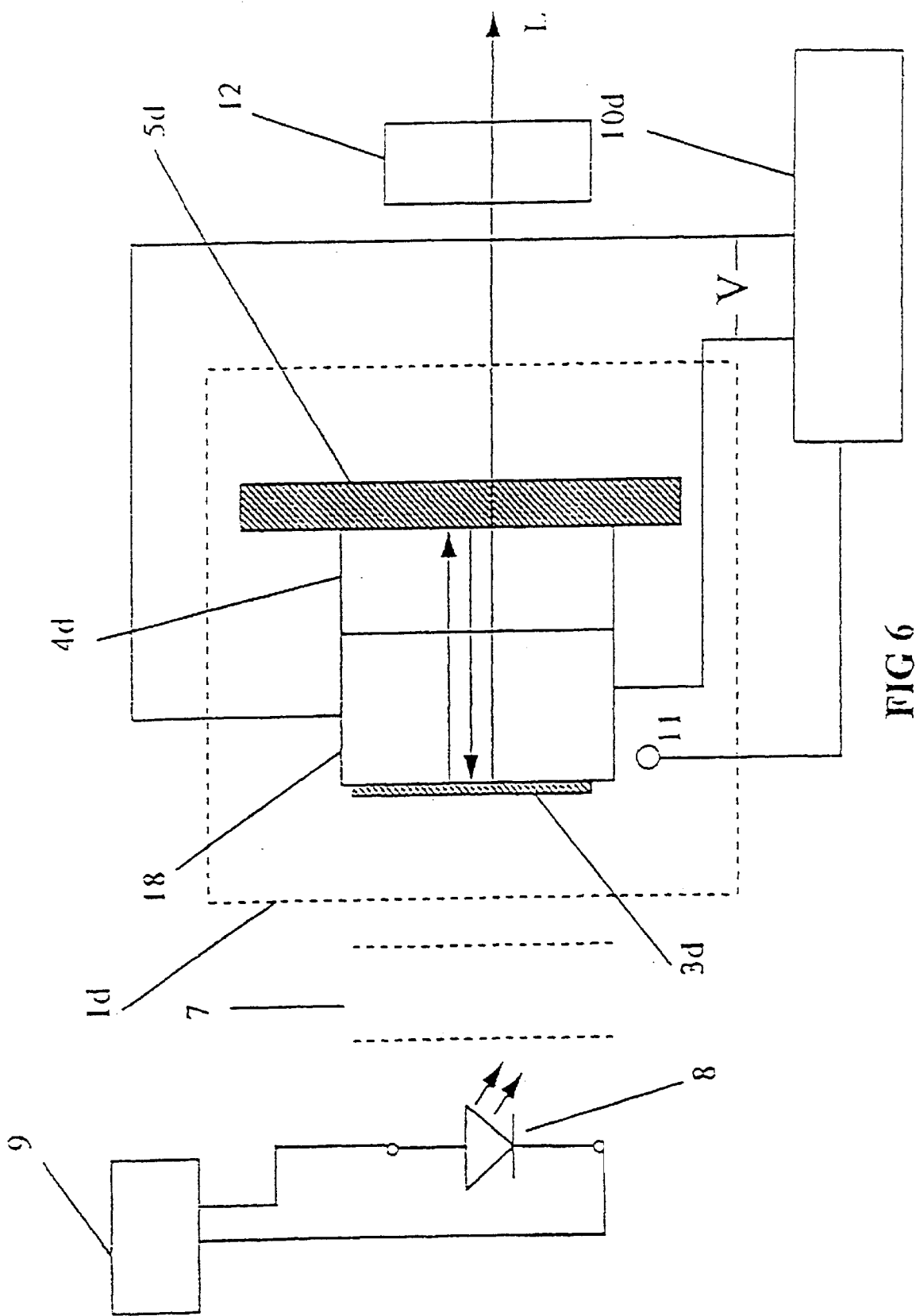
FIG. 6 shows schematically a fifth embodiment of the Q-switched laser according to the invention.

In the embodiment shown in FIG. 6, the laser 1d comprises a combined element 18 having both the gain-medium and the active modulation fumction, and a saturable absorber 4d between a first mirror 3d and a second mirror 5d. The modulation of the combined element 18 is controlled by the control circuit 10d.

Figure 7:
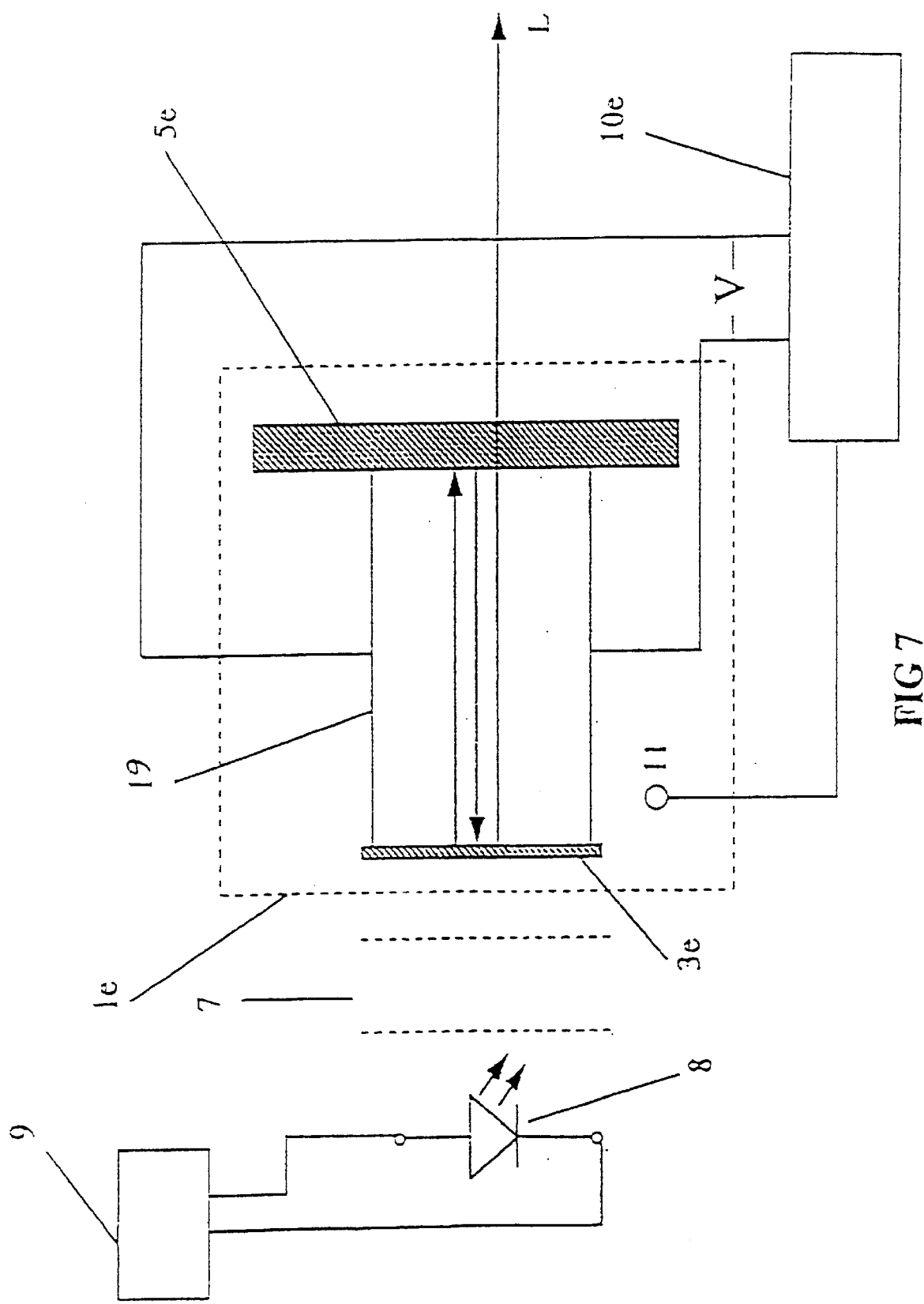
FIG. 7 shows schematically a sixth embodiment of the Q-switched laser according to the invention.

In the embodiment shown m FIG. 7, the laser 1e comprises a combined element combining all three fimctions: gain-medium, saturable absorber and active modulation. The loss in the active modulation part of the combined element 19 is controlled by a control circuit 10e. A wavelength converting element is not present in this embodiment in order to show that such an element is not always necessary. However. such an element could also be present in this embodiment in the same way that it could be deleted from the other embodiments.

Figure 8:
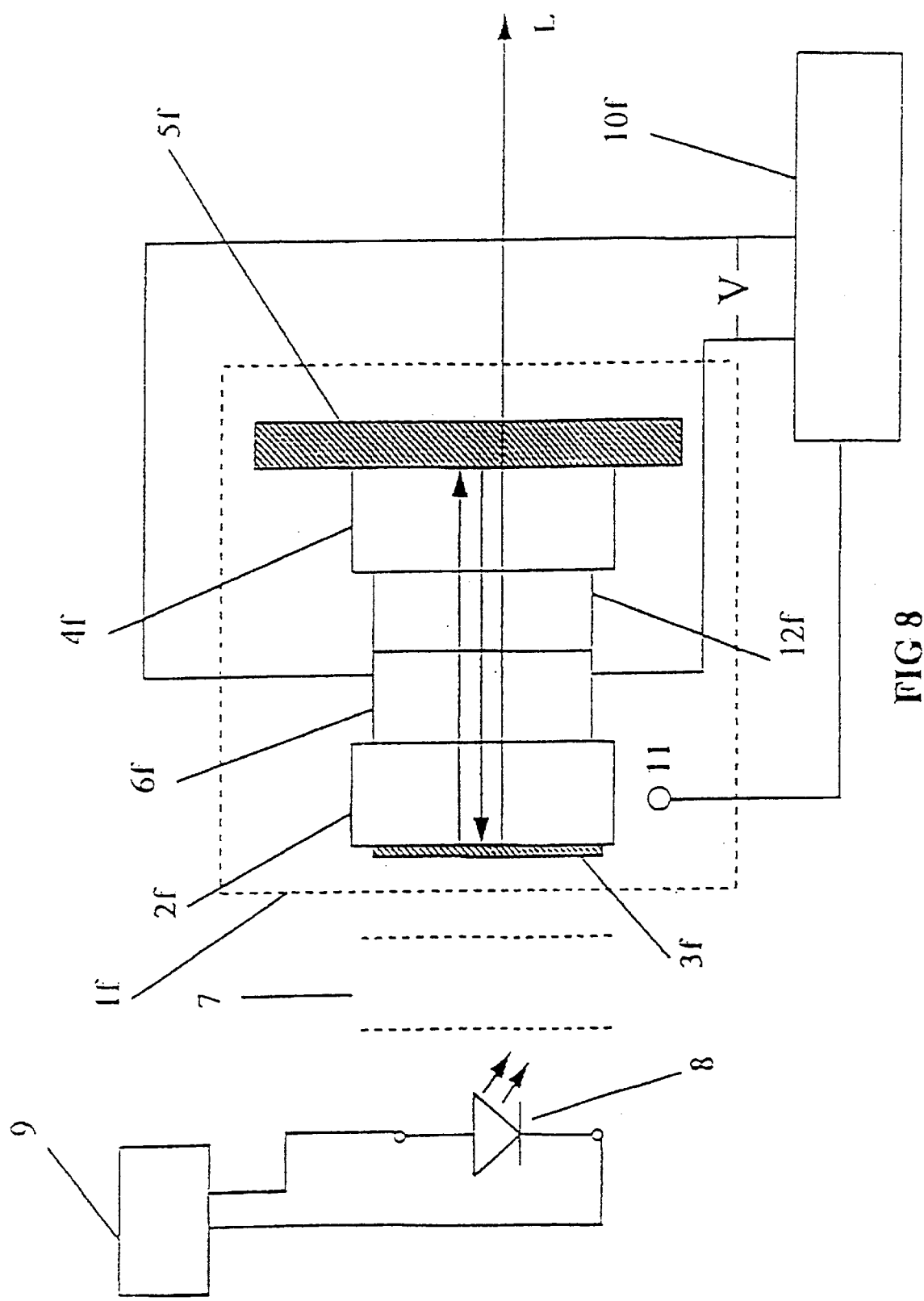
FIG. 8 shows schematically a seventh embodiment of the Q-switched laser according to the invention.

In the embodiment shown in FIG. 8, the elements 2f to 6f have the same positions and functions as the elements 2 to 6, respectively, in FIG. 1. A wavelength converting element 12f is placed between the elements 6f and 4f. This embodiment shows that a wavelength converting element also could be placed inside the laser cavity instead of outside it.

The inventive laser is well adapted to be used as a light emitting element in an EDM-instniment or a laser-alignment instniment.

While the invention has been described with reference to specific embodiments, it will be understood by those skilled in the art that various changes may be made and equivalents may be substituted for elements thereof without departing from the scope of the invention as defined in the accompanying claims. For instance, the laser is not dependent upon the materials in and the exact design of the laser cavity.

What is claimed is:

1. A Q-switched laser, which is pumped by at least one pump source, providing pulses, and comprising:
   a first mirror at a first end and a second mirror at a second end, at least one of said mirrors being partially transmittable and a space between said mirrors providing a laser cavity;
   a combination of a gain medium, a saturable absorber, and a controllable active modulator between said first and second mirror, wherein losses from said controllable active modulator are less than a loss required for suppressing lasing in the laser cavity, losses from said saturable absorber are less than the loss required for suppressing lasing in the laser cavity, and combined losses from said saturable absorber and said active modulator are greater than the losses required for suppressing lasing in the laser cavity during a determined time between pulses; and
   a control device controlling the lasing such that:
      in a first stage the combined losses from said saturable absorber and said active modulator is present in said laser cavity, setting a threshold inversion density band high enough to suppress lasing; and
      in a second stage the loss from said active modulator is instantly removed, lowering the threshold inversion density band to a level lower than an inversioned density in the cavity, resulting in bleaching of said saturable absorber and thereby the build up of a giant pulse at a determined time.

2. A Q-switched laser according to claim 1, wherein said saturable absorber and said modulator is a combined element (14) controllable by said control device.

3. A Q-switched laser according to claim 1, wherein said gain-medium and said modulator is a combined element (18) controllable by said control device.

4. A Q-switched laser according to claim 1, wherein said gain medium and said saturable absorber is a combined element (19).

5. A Q-switched laser according to claim 1, wherein said gain medium and said saturable absorber and said modulator is a combined element (19).

6. A Q-switched laser according to claim 1, comprising a means for converting the wavelength of the laser pulse to another wavelength.

7. A Q-switched laser according to claim 6, wherein said wavelength converting means (12) is provided on an outside of one of said mirrors and comprises non-linear material providing a non-linear conversion.

8. A Q-switched laser according to claim 6, wherein said wavelength converting means (12*f*) is provided between said first and said second mirror and comprises non-linear material providing a non-linear conversion.

9. A Q-switched laser according to claim 1, wherein said gain medium (2) is adapted to emit polarized light and said control device controls said modulator to change the polarization of the light at said first stage and controls said modulator (6) so that the modulator does not change the polarization of light during said second stage.

10. A Q-switched laser according to claim 1, wherein a separate polarizing element is placed at said gain medium, which is not emitting polarized light, providing a polarizing effect on the light emitting from said gain medium; and said control device controls said modulator to change the polarization of the light at said first stage and controls said modulator so that it does not change the polarization of light during said second stage.

11. A Q-switched laser according to claim 1, wherein said modulator comprises at least one of said first and said second mirror (16, 17) having controllable characteristics, controllable by said control device.

12. A Q-switched laser according to claim 1, wherein each said modulator comprises a material having controllable transmission controlled by said control device.

13. A Q-switched laser according to claim 1, wherein said modulator comprises an acousto-optically modulator deflecting at least a part of said beam inside said laser when actively controlled by said control device.

14. A Q-switched laser according to claim 1, comprising means (11) for monitoring spontaneous emission from said gain medium, said emission being proportional to said inversion density in said gain medium.

15. A Q-switched laser according to claim 14, comprising means for controlling said inversion density in the gain medium with pump power coupled into said laser cavity.

16. A Q-switched laser according to claim 14, comprising means for controlling the threshold inversion density band with the loss in said laser cavity.

17. A Q-switched laser according to claim 14, comprising means for controlling the inversion density in said gain medium with pump power coupled into said laser cavity and controlling the threshold inversion density with the loss in said laser cavity.

18. A Q-switched laser according to claim 1, wherein the control device resets a pump pulse when the Q-switched laser pulse has been emitted.

19. A Q-switched laser according to claim 1, wherein said modulation of said pump laser source is controlled so as to have a varying frequency during an operation period.

20. A Q-switched laser according to claim 1, where the parts are bonded together by diffusion bonding or optical bonding.

21. A Q-switched laser according to claim 1, wherein a pumping diode directly pumps a crystal assembly or is coupled via lenses or a fiber.

22. A Q-switched laser according to claim 21, wherein the crystal assembly and the pumping diode are integrated on a substrate to facilitate temperature control and heat removal.

23. A Q-switched laser according to claim 1, wherein optical parts are self aligned onto a substrate for mass production purposes.

24. A light emitting element in an EDM-instrument Q-switched laser, which is pumped by at least one pump source, providing pulses, and comprising:
   a first mirror at a first end and a second mirror at a second end, at least one of said mirrors being partially transmittable and a space between said mirrors providing a laser cavity;
   a combination of a gain medium, a saturable absorber, and a controllable active modulator between said first and second mirror, wherein losses from said controllable active modulator are less than a loss required for suppressing lasing in the laser cavity; losses from said saturable absorber are less than the loss required for suppressing lasing in the laser cavity, and combined losses from said saturable absorber and said active modulator are greater than the losses required for suppressing lasing in the laser cavity during a determined time between pulses; and
   a control device controlling the lasing such that in a first stage the combined losses from said saturable absorber and said active modulator is present in said laser cavity, setting a threshold inversion density band high enough to suppress lasing; and in a second stage the loss from said active modulator is instantly removed, lowering the threshold inversion density band to a level lower than an inversioned density in the cavity, resulting in bleaching of said saturable absorber and thereby the build up of a giant pulse at a determined time.

25. A light emitting element in a laser-alignment instrument Q-switched laser, which is pumped by at least one pump source, providing pulses, and comprising:

a first mirror at a first end and a second mirror at a second end, at least one of said mirrors being partially transmittable and a space between said mirrors providing a laser cavity;

a combination of a gain medium, a saturable absorber, and a controllable active modulator between said first and second mirror, wherein losses from said controllable active modulator are less than a loss required for suppressing lasing in the laser cavity; losses from said saturable absorber are less than the loss required for suppressing lasing in the laser cavity, and combined losses from said saturable absorber and said active modulator are greater than the losses required for suppressing lasing in the laser cavity during a determined time between pulses; and a control device controlling the lasing such that in a first stage the combined losses from said saturable absorber and said active modulator is present in said laser cavity, setting a threshold inversion density band high enough to suppress lasing; and in a second stage the loss from said active modulator is instantly removed, lowering the threshold inversion density band to a level lower than an inversioned density in the cavity, resulting in bleaching of said saturable absorber and thereby the build up of a giant pulse at a determined time.

* * * * *